United States Patent [19]
Mead

[11] Patent Number: 6,137,920
[45] Date of Patent: *Oct. 24, 2000

[54] METHOD AND SYSTEM FOR GENERATING IMAGE FRAME SEQUENCES USING MORPHING TRANSFORMATIONS

[75] Inventor: Donald C. Mead, Carlsbad, Calif.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,651

[22] Filed: May 1, 1996

[51] Int. Cl.[7] .............................. G06K 9/32; G06K 9/36; G06K 9/56; G03B 13/00
[52] U.S. Cl. ......................... 382/294; 382/236; 382/291; 382/308; 348/579; 348/620
[58] Field of Search .................................... 382/236, 291, 382/294, 308; 348/579, 620

[56] References Cited

U.S. PATENT DOCUMENTS

| 5,253,065 | 10/1993 | Richards et al. | 348/579 |
|---|---|---|---|
| 5,305,400 | 4/1994 | Butera | 382/236 |
| 5,376,971 | 12/1994 | Kadono et al. | 348/699 |
| 5,438,374 | 8/1995 | Yan | 348/620 |
| 5,485,611 | 1/1996 | Astle | 382/236 |
| 5,557,684 | 9/1996 | Wang et al. | 382/236 |
| 5,598,216 | 1/1997 | Lee | 348/416 |
| 5,608,458 | 3/1997 | Chen et al. | 348/413 |
| 5,623,587 | 4/1997 | Bulman | 345/435 |

FOREIGN PATENT DOCUMENTS

| 2289819 | 11/1995 | United Kingdom | H04N 13/02 |
|---|---|---|---|

OTHER PUBLICATIONS

Russ "The Imaging Processing Handbook," second edition, IEEE Press, pp. 207–210, 1994.
Beier, et al "Feature–Based Image Metamorphosis," ACM–0–89791–479, Jan. 1992.
Siew "Video Compression via Morphing", Monash University, Nov. 21, 1995, pp. 1–20.

*Primary Examiner*—Phuoc Tran
*Assistant Examiner*—Daniel G. Mariam
*Attorney, Agent, or Firm*—John A. Crook; Michael W. Sales

[57] ABSTRACT

A method and system are provided for generating an output time sequence of image frames from an input time sequence of image frames. For pairs of consecutive image frames of the input time sequence defining a frame rate less than a predetermined output frame rate, a plurality of feature points are identified and located in each of the consecutive image frames. Using the feature points, a first frame of the consecutive image frames is morphed with a second frame of the consecutive image frames to form at least one intermediate frame. The first frame, the at least one intermediate frame, and the second frame are then sequentially organized to form consecutive frames of the output time sequence having the predetermined output frame rate. Pairs of consecutive image frames of the input time sequence having at least the predetermined output frame rate are maintained as consecutive pairs in the output time sequence.

12 Claims, 1 Drawing Sheet

METHOD AND SYSTEM FOR GENERATING IMAGE FRAME SEQUENCES USING MORPHING TRANSFORMATIONS

CROSS-REFERENCE TO RELATED APPLICATIONS

The present application is related to "Methods and Systems For High Compression Rate Encoding of Objects in Video and Film", having Ser. No. 08/551,048, filed Oct. 31, 1995, and is assigned to the same assignee as the above-identified related application. The subject matter of the above-identified related application is hereby incorporated by reference into the disclosure of the present application.

TECHNICAL FIELD

The present invention relates to methods and systems for decoding time sequences of image frames.

BACKGROUND OF THE INVENTION

Video compression systems are employed to reduce the number of bits needed to transmit and store a digital video signal. As a result, a lower bandwidth communication channel can be employed to transmit a compressed video signal in comparison to an uncompressed video signal. Similarly, a reduced-capacity storage device (such as a memory or a magnetic storage medium) can be employed to store a compressed video signal.

A general video compression system includes an encoder, which converts the video signal into a compressed signal, and a decoder, which reconstructs the video signal based upon the compressed signal. In applications such as video teleconferencing and television, the encoder is located remotely from the decoder, and hence, the encoder and the decoder communicate by a predetermined communication channel. In many situations, the predetermined communication channel provides a fixed bit rate of bandwidth.

Present video compression standards, such as CCITT recommendation h.261, accommodate a fixed bit rate channel by reducing a frame rate for spatially-complex scenes and for scenes having motion. Reducing the frame rate results in a decoded video signal that is best described as "jerky". Attempts have been made to fill in the missing frames by replacing frames or using linear interpolation techniques. However, the resulting video using linear interpolation is also unpleasant to view.

SUMMARY OF THE INVENTION

It is an object of the present invention to provide an improved method and system for recreating missing frames in a time sequence of images.

Another object of the present invention is to provide an improved method and system for recreating a video image sequence from a received image sequence transmitted at a frame rate below a suitable display rate.

In carrying out the above objects, the present invention provides a method of generating an output time sequence of image frames from an input time sequence of image frames. The method includes a step of receiving a pair of consecutive received image frames of the input time sequence at a frame rate less than a predetermined frame rate. Steps of identifying and locating a plurality of feature points in a first frame and a second frame of the pair of consecutive image frames are performed. Using the plurality of feature points, a step of morphing the first frame with the second frame is performed to form at least one intermediate frame. A step of sequentially organizing the first frame, the at least one intermediate frame, and the second frame is performed to form consecutive frames of the output time sequence at the predetermined output frame rate.

Further in carrying out the above objects, the present invention provides a system for generating an output time sequence of image frames from an input time sequence of image frames. The system includes a receiver which receives the input time sequence and an image processor which forms the output time sequence in accordance with the above-described steps.

These and other features, aspects, and embodiments of the present invention will become better understood with regard to the following description, appended claims, and accompanying drawings.

BEST MODE FOR CARRYING OUT THE INVENTION

Figure 1:
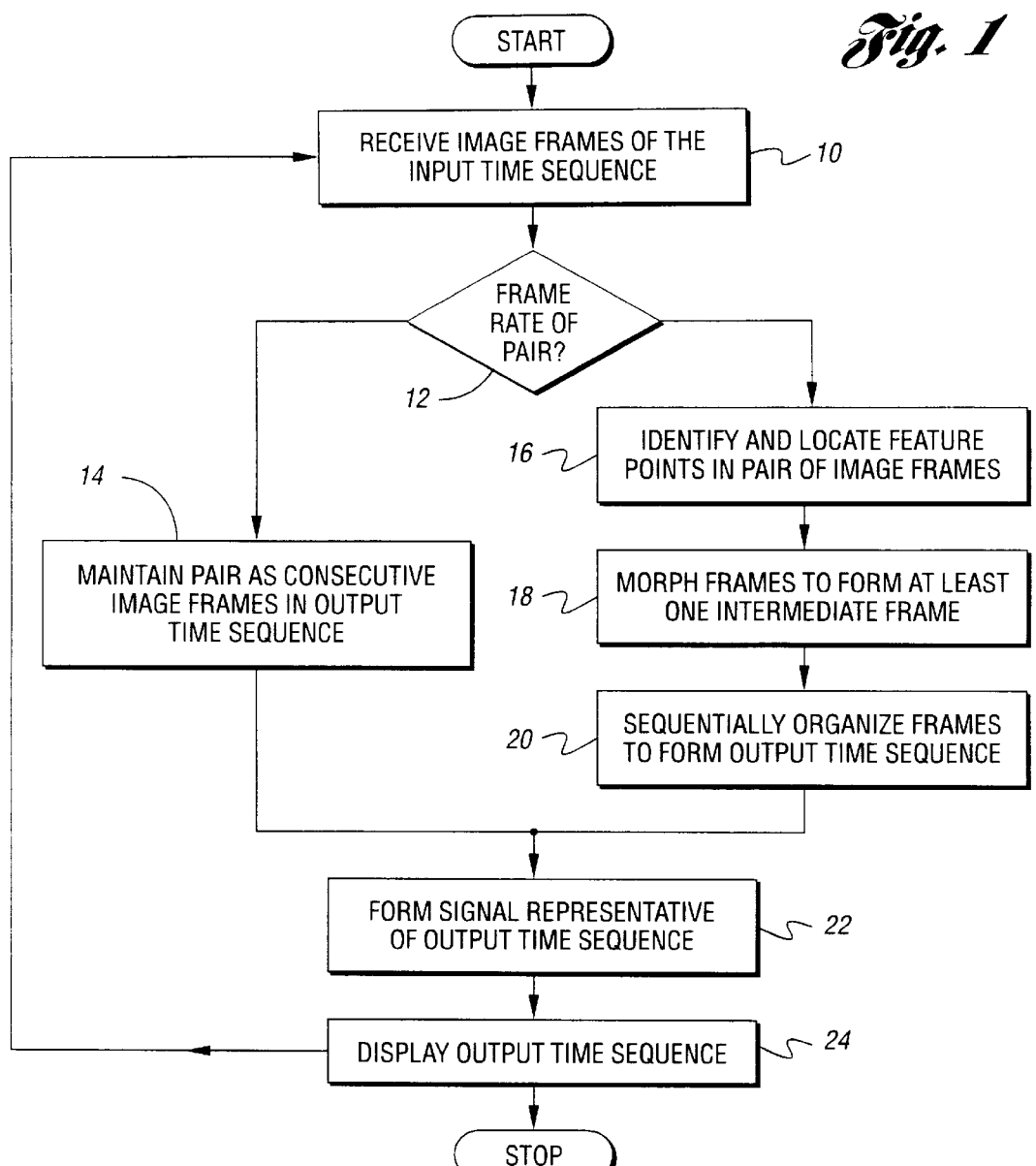
FIG. 1 is a flow diagram of an embodiment of a method of generating a time sequence of image frames using a morphing transformation in accordance with the present invention.

Turning now to FIG. 1, there is shown a block diagram of an embodiment of a method of generating an output time sequence of image frames from an input time sequence of image frames. As indicated by block 10, the method includes a step of receiving the image frames of the input time sequence. Typically, the image frames are sequentially received in accordance with the time sequence, although embodiments of the present invention are not limited thereto.

The instantaneous frame rate of the input time sequence, which is defined as the reciprocal of the time interval between consecutive image frames, is allowed to vary for different pairs of image frames. Frame rates can vary in applications such as video teleconferencing. For example, a video teleconferencing application which utilizes the h.261 video standard may witness a reduced frame rate if either the spatial complexity or the motion in a scene is excessive.

In order to describe the method, a single pair of consecutive image frames of the input time sequence is considered. Regardless of their position within the input time sequence, the pair of consecutive image frames will be specifically referred to as a first frame and a second frame.

As indicated by block 12, the instantaneous frame rate defined by the time interval between a pair of consecutive image frames in the received input time sequence is compared to a predetermined frame rate. The predetermined frame rate can be, for example, a predetermined output frame rate which provides a desirable display of the output time sequence. Although the predetermined frame rate can vary, the description herein is illustrated in terms of a fixed output frame rate.

If the pair of consecutive image frames of the input time sequence define an instantaneous frame rate which is at least the predetermined frame rate, then the pair of consecutive image frames are maintained as consecutive image frames in the output time sequence, as indicated by block 14.

If the pair of consecutive frames define an instantaneous frame rate less than the predetermined frame rate, then a step of identifying and locating a plurality of feature points in both the first frame and the second frame is performed, as indicated by block 16. Thereafter, a step of morphing the first frame with the second frame using the plurality of feature points is performed, as indicated by block 18. The step of morphing is performed to form at least one intermediate frame between the first frame and the second frame. The number of intermediate frames formed is dependent upon the instantaneous frame rate. Specifically, the number of intermediate frames is inversely related to the instantaneous frame rate.

As is known in the art of image processing, the step of morphing can be performed by warping the first frame to form at least one warped first frame, warping the second frame to form at least one warped second frame, and blending each of the at least one warped first frame with a respective one of the at least one warped second frame to form the at least one intermediate frame. The blending may be either linear or nonlinear. A mapping of the feature points is calculated to smoothly transform the first frame to each intermediate frame. The mapping may be either linear or nonlinear. An interpolation transformation can be used to map the feature points to new image times, corresponding to the intermediate frame times, between the frame times of the first frame and the second frame.

As indicated by block 20, a step of sequentially organizing the first frame, the at least one intermediate frame, and the second frame is performed to form consecutive frames of the output time sequence. As a result, the consecutive frames of the output time sequence define a frame rate which is at least the predetermined frame rate.

The steps of identifying and locating feature points (block 16), morphing frames using the feature points to form at least one intermediate frame (block 18), and sequentially organizing the frames (block 20) to form the output time sequence are repeated for each pair of consecutive image frames of the input time sequence which define a frame rate which is less than the predetermined frame rate. In contrast, each pair of consecutive image frames defining a frame rate which is at least the predetermined frame rate are maintained as consecutive image frames in the output time sequence. As a result, the instantaneous frame rate of the output time sequence is maintained at least at the predetermined frame rate regardless of variations of the frame rate of the input time sequence.

As indicated by block 22, a step of forming a signal representative of the output time sequence of image frames can be performed. The signal can be in the form of a digital signal or an analog signal, and can be either a baseband video signal or a modulated radio frequency signal. The signal can be applied to a display device in order to display the output time sequence, as indicated by block 24.

Figure 2:
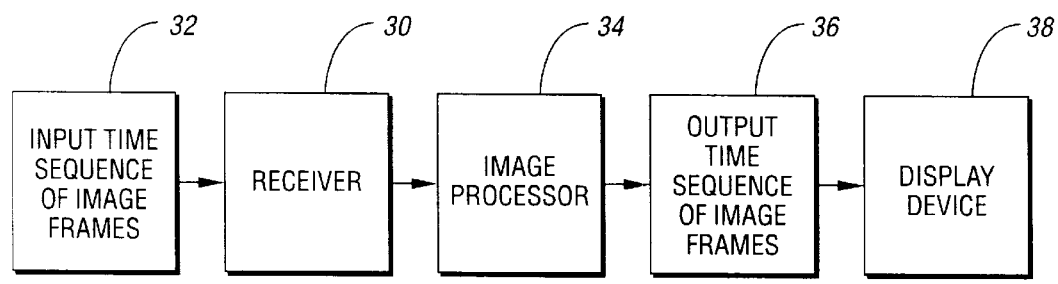
FIG. 2 is a block diagram of an embodiment of a system for generating a time sequence of image frames using a morphing transformation.

Referring to FIG. 2, there is shown a block diagram of an embodiment of a system for decoding a time sequence of image frames in accordance with the present invention. A receiver 30 receives a signal representative of an input time sequence of image frames 32. The receiver 30 communicates the input time sequence to an image processor 34. The image processor 34 is operative to form an output time sequence by maintaining pairs of consecutive image frames, which define an instantaneous frame rate having at least the predetermined frame rate, as consecutive image frames in the output time sequence.

For each pair of image frames which define an instantaneous frame rate less than the predetermined frame rate, the image processor 34 is operative to: (i) identify and locate the plurality of feature points in both a first frame and a second frame; (ii) morph the first frame with the second frame using the feature points to form at least one intermediate frame; and (iii) sequentially organize the first frame, the at least one intermediate frame and the second frame to form consecutive frames of an output time sequence 36. As described earlier, the image processor 34 can morph the first frame with the second frame by warping and blending the frames.

A signal representative of the output time sequence 36 can be applied to a display device 38 to display the output time sequence 36. The display device 38 can be embodied by a television, a video teleconferencing display, a computer monitor, or the like.

The video decoding method and system in accordance with the present invention can be implemented within a decoder box which connects between a video receiver (e.g. a video teleconferencing receiver) and a display device (e.g. a monitor). As a result, embodiments of the present invention are well-suited for video teleconferencing applications, television applications, and the like. Typically, the output sequence is produced contemporaneously with the reception of the input sequence in these applications. Here, a display of the output sequence would be only slightly delayed in comparison to a simultaneous display of the input sequence.

The above-described embodiments of the present invention have many advantages. By using morphing technology in a video decoder, high-quality video can be recreated from a frame sequence which is transmitted at a frame rate below a suitable display rate. Further, embodiments of the present invention are advantageous in producing high-quality video from a variable frame rate input sequence by creating any missing frames using a morphing transformation.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of generating a non-repetitive output time sequence of image frames in a continuous full motion video stream, from a lesser input time sequence of full motion video image frames, the method comprising the steps of:
    (a) receiving as part of the input time sequence of full motion video image frames a pair of consecutive image frames of the input time sequence of full motion video image frames, the pair of consecutive image frames including a first frame and a second frame, the pair of consecutive frames defining a frame rate less than a predetermined frame rate;
    (b) identifying and locating a plurality of feature points in both the first frame and the second frame;
    (c) morphing the first frame with the second frame using the plurality of feature points to form at least one intermediate frame;
    (d) sequentially organizing the first frame, the at least one intermediate frame, and the second frame to form consecutive frames of the output time sequence;
    (e) receiving a second pair of consecutive image frames of the input time sequence differing from the first pair received in step (a), second pair of consecutive image frames including a third frame and a fourth frame, the second pair defining a frame rate which is at least the predetermined frame rate; and
    (f) maintaining the second pair of consecutive image frames as image frames in the non-repetitive output time sequence;

wherein the consecutive frames of the non-repetitive output time sequence define a non-repetitive full motion video stream having a frame rate which is at least the predetermined frame rate.

2. The method of claim 1 wherein steps (a) to (d) are repeated for subsequent pairs of consecutive image frames of the input time sequence which define a frame rate less than the predetermined frame rate, wherein the subsequent pairs differ from each other and from the first pair.

3. The method of claim 1 wherein the input time sequence has a variable frame rate, and wherein the predetermined frame rate is fixed.

4. The method of claim 3 further comprising the step of displaying non-repetitive the output time sequence at the predetermined frame rate.

5. The method of claim 1 wherein the step of morphing includes:

warping the first frame to form at least one warped first frame;

warping the second frame to form at least one warped second frame; and blending each of the at least one warped first frame with a respective one of the at least one warped second frame to form the at least one intermediate frame.

6. A system for generating a non-repetitive output time sequence of image frames in a continuous full motion video stream, from a lesser input time sequence of full motion video image frames, the system comprising:

a receiver which receives a signal representative of the input time sequence, the input time sequence including a pair of consecutive image frames which define a frame rate less than a predetermined (display) frame rate, the pair of consecutive image frames including a first frame and a second frame; and an image processor operative to identify and locate a plurality of feature points in both the first frame and the second frame, and to morph the first frame with the second frame using the plurality of feature points to form at least one intermediate frame, the image processor further operative to sequentially organize the first frame, the at least one intermediate frame, and the second frame to form consecutive frames of the non-repetitive full motion video output time sequence at the predetermined output frame rate;

wherein the consecutive frames of the non-repetitive full motion video output sequence define a non-repetitive video stream having a frame rate which is at least the predetermined frame rate, and wherein the receiver receives a second pair of consecutive image frames of the input time sequence differing from the first pair, the second pair defining a frame rate which is at least the predetermined output frame rate, wherein the image processor maintains the second pair of consecutive image frames as consecutive image frames in the non-repetitive output time sequence.

7. The system of claim 6 wherein the image processor is operative to form at least one intermediate frame for subsequent pairs of consecutive image frames of the input time sequence defining a frame rate less than the predetermined frame rate, wherein the subsequent pairs differ from each other and from the first pair.

8. The system of claim 6 wherein the input time sequence has a variable frame rate, and wherein the predetermined frame rate is fixed.

9. The system of claim 6 wherein the image processor forms the at least one intermediate frame by warping the first frame to form at least one warped first frame, warping the second frame to form at least one warped second frame, and blending each of the at least one warped first frame with a respective one of the at least one warped second frame to form the at least one intermediate frame.

10. A method of generating a non-repetitive output time sequence of image frames in a continuous full motion video stream, from a lesser input time sequence of full motion video image frames, the method comprising the steps of (a) receiving as part of the input time sequence of fall motion video image frames a pair of consecutive image frames, the pair of consecutive image frames including a first frame and a second frame, and defining a frame rate less than a predetermined frame rate;

(b) identifying and locating a plurality of feature points in both the first frame and the second frame;

(c) morphing the first frame with the second frame using the plurality of feature points to form at least one intermediate frame; and (d) sequentially organizing the first frame, the at least one intermediate frame, and the second frame to form consecutive frames of the non-repetitive output time sequence;

wherein the consecutive frames of the non-repetitive output time sequence define a full motion video stream having a frame rate which is at least the predetermined frame rate;

(e) receiving a second pair of consecutive image frames of the input time sequence differing from the first pair received in step (a), the second pair of consecutive image frames including a third frame and a fourth frame, the second pair defining a frame rate which is at least the predetermined frame rate;

(f) maintaining the second pair of consecutive image frames as image frames in the non-repetitive output time sequence.

11. The method of claim 10 further comprising the steps of:

(g) identifying and locating a plurality of feature points in both the third frame and the fourth frame;

(h) morphing the third frame with the fourth frame using the plurality of feature points to form at least one intermediate frame associated with the second pair of consecutive image frames; and (i) sequentially organizing the third frame, the at least one intermediate frame associated with the second pair, and the fourth frame to form consecutive frames of the non-repetitive output time sequence.

12. The method of claim 1 further comprising the steps of:

(g) identifying and locating a plurality of feature points in both the third frame and the fourth frame;

(h) morphing the third frame with the fourth frame using the plurality of feature points to form at least one intermediate frame associated with the second pair of consecutive image frames; and (i) sequentially organizing the third frame, the at least one intermediate frame associated with the second pair, and the fourth frame to form consecutive frames of the non-repetitive output time sequence.

* * * * *